(12) United States Patent
LeFevre et al.

(10) Patent No.: US 11,787,211 B2
(45) Date of Patent: Oct. 17, 2023

(54) SHEET COOLING SYSTEM FOR A PRINTING DEVICE

(71) Applicant: Xerox Corporation, Norwalk, CT (US)

(72) Inventors: Jason M. LeFevre, Penfield, NY (US); Douglas K. Herrmann, Webster, NY (US); Seemit Praharaj, Webster, NY (US); Chu-heng Liu, Penfield, NY (US); Jorge A. Alvarez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 28 days.

(21) Appl. No.: 17/690,937

(22) Filed: Mar. 9, 2022

(65) Prior Publication Data
US 2023/0286305 A1 Sep. 14, 2023

(51) Int. Cl.
*B41J 29/377* (2006.01)
*B23Q 11/10* (2006.01)
*B41F 23/04* (2006.01)
*B41F 13/22* (2006.01)
*B41F 3/52* (2006.01)

(52) U.S. Cl.
CPC .............. *B41J 29/377* (2013.01); *B23Q 11/10* (2013.01); *B41F 3/52* (2013.01); *B41F 13/22* (2013.01); *B41F 23/04* (2013.01); *B41F 23/0476* (2013.01); *B41F 23/0483* (2013.01); *B65H 2301/5144* (2013.01); *B65H 2301/5305* (2013.01); *B65H 2404/1361* (2013.01); *B65H 2701/528* (2013.01)

(58) Field of Classification Search
CPC .......... B41J 29/377; B23Q 11/10; B41F 3/52; B41F 13/22; B41F 23/04; B41F 23/0476; B41F 23/0483; B65H 2301/5144; B65H 2301/5305; B65H 2404/1361; B65H 2701/528
See application file for complete search history.

(56) References Cited

U.S. PATENT DOCUMENTS

| | | | |
|---|---|---|---|
| 9,348,284 B2 * | 5/2016 | Watanabe | B65H 5/26 |
| 9,827,797 B1 * | 11/2017 | Boland | B41J 15/04 |
| 2011/0010249 A1 | 1/2011 | Kovacs et al. | |
| 2014/0198164 A1 | 7/2014 | Thayer et al. | |
| 2015/0273872 A1 * | 10/2015 | Fukumoto | B41J 29/377 347/102 |

* cited by examiner

*Primary Examiner* — Henok D Legesse
(74) *Attorney, Agent, or Firm* — Lippes Mathias LLP (57) ABSTRACT

A multi-sheet cooling buffer suitable for use in a printing device and a method of sheet processing with the cooling buffer are described. The cooling buffer includes an inlet and an outlet and a sheet cooling mechanism. An array of cooling stations, intermediate the inlet and the outlet, are each configured to receive print media sheets independently from the inlet and direct cooled sheets towards the outlet. In the cooling buffer, multiple print media sheets are able to be cooled contemporaneously in respective ones of the cooling stations.

20 Claims, 8 Drawing Sheets

SHEET COOLING SYSTEM FOR A PRINTING DEVICE

BACKGROUND

The exemplary embodiment relates to printing devices and finds particular application in connection with a cooling system for cooling sheets prior to inkjet printing.

Inkjet printers operate a plurality of inkjets in each printhead to eject liquid ink onto an image receiving member, such as a sheet of paper. The ink can be stored in reservoirs that are located within cartridges installed in the printer. Such ink can be in liquid form, such as an aqueous ink or an ink emulsion. The sheet with the applied ink is dried with a dryer to remove excess water or other solvents. As a result, the sheet can be significantly above room temperature. In the case of duplex printing, where the sheet is printed on both sides, the heat retained by the sheet after going through the dryer can cause imperfections when the sheet is printed on the second side. For example, the temperature of the sheet can result in graininess in the images printed by the printhead.

One way to address this problem is to cool the sheets with air-cooled rollers, before printing again. However, for heavyweight sheets (e.g., sheets of 200 gsm/500 sheets, and above), the number of rollers needed to reduce the sheet temperature to an appropriate temperature for printing may be significant and thus impractical. Consequently, the printing speed may be set lower for heavyweight sheets.

There remains a need for a cooling system with a compact footprint for reducing the temperature of heated sheets prior to printing, which can accommodate heavyweight paper.

INCORPORATION BY REFERENCE

The following references, the disclosures of which are incorporated herein in their entireties by reference, are mentioned:

U.S. Pat. No. 9,827,797, issued Nov. 28, 2017, entitled CROSS-FLOW COOLING SYSTEMS FOR CONTINUOUS-FORM PRINT MEDIA, by Boland, et al., describes a set of air-cooled rollers that cool a print medium downstream of a dryer while minimizing the temperature differentials across the print medium.

U.S. Pub. No. 20110102491A1, published May 5, 2011, entitled COOLER FOR A PRINTER, by Kovacs, et al., describes an inkjet printer which includes a cooler positioned proximate a media path to cool an ink receiving member prior to ink being ejecting from a printhead onto the ink receiving member.

U.S. Pub. No. 20140198164A1, published Jul. 17, 2014, entitled INKJET PRINTER HAVING AN IMAGE DRUM HEATING AND COOLING SYSTEM, by Thayer, et al., describes an inkjet offset printer includes an image receiving drum with a heating and a cooling system located in an internal cavity of the drum.

U.S. Pub. No. 20150273872A1, published Oct. 1, 2015, entitled INK JET METHOD AND INK JET APPARATUS, by Fukumoto, et al., describes a cooling device for cooling an attachment body on which an ultraviolet curable composition from an ejection head is received and cured.

BRIEF DESCRIPTION

In accordance with one aspect of the exemplary embodiment, a multi-sheet cooling buffer includes an inlet and an outlet, a sheet cooling mechanism, and an array of cooling stations, intermediate the inlet and the outlet, which are configured to receive print media sheets independently from the inlet and direct cooled sheets towards the outlet, whereby multiple print media sheets are cooled contemporaneously in the multi-sheet cooling buffer.

In accordance with another aspect of the exemplary embodiment, a sheet processing method includes receiving a sequence of print media sheets through a common inlet, directing the sheets sequentially to respective ones of an array of cooling stations until each of the cooling stations holds a respective one of the sheets, cooling the sheets in the cooling stations, and sequentially releasing the sheets from the cooling stations to a common outlet.

In accordance with another aspect of the exemplary embodiment, a printing device incudes a print media source, an output device, and a print media pathway connecting the print media source and the output device. A marking device is in the print media pathway, intermediate the print media source and the output device, which forms images on the print media with a marking material. A dryer in the print media pathway, downstream of the marking device, dries the images and increases a temperature of the sheets. A multi-sheet cooling buffer, downstream of the dryer, cools the heated sheets. The multi-sheet cooling buffer includes an array of cooling stations which are each configured to receive heated print media sheets. Each of the cooling stations includes a continuous belt. Sheet receiving surfaces of each of the belts are arranged in parallel, whereby multiple print media sheets are cooled contemporaneously in the multi-sheet cooling buffer.

DETAILED DESCRIPTION

Aspects of the exemplary embodiment relate to a cooling system for a printing device and to a method which includes cooling sheets of print media prior to printing.

As used therein, the term "printing device" refers to any device for rendering a document on print media using a marking material. Example printing devices include printers, facsimile machines, copiers, book-making machines, and related multi-function devices.

"Print media" can be a physical sheet of paper, plastic, or other suitable physical print media substrate for images. Particular reference is made to heavy-weight paper and glossy paper as the print medium, although it is to be appreciated that other types of print media may also be employed in the exemplary printing device and method.

A "print job" or "document" is normally a set of related sheets, usually one or more collated copy sets copied from a set of original print job sheets or electronic document page images, from a particular user, or otherwise related.

"Marking material" refers to materials that are applied to the print media in rendering an image, such as one or more inks or toners.

Particular reference is made herein to an inkjet printer, which ejects droplets of ink directly onto an image-receiving surface (or surfaces) of the print media or indirectly, via an intermediate transfer member, such as a drum. Example inks include aqueous inks, non-aqueous solvent-based inks, phase change inks, and gel inks. However, it is to be appreciated that other printing devices and marking materials are also contemplated, such as electrophotographic (laser) printers using toners.

A "digital image" generally may include information in electronic form which is to be rendered on the print media by the printing device and may include text, graphics, pictures, and the like. The operation of applying images in physical form to print media, for example, graphics, text, photographs, etc., is generally referred to herein as printing or marking.

"Duplex printing" refers to printing images on both image-receiving surfaces of a sheet of print media.

A "document" is used herein to mean an electronic (e.g., digital) or physical (e.g., paper) recording of information.

While the printing device is described herein as a duplex printing system, the cooling system described herein also finds application in simplex printing to reduce printed sheet temperature prior to stacking and outputting.

Figure 1:
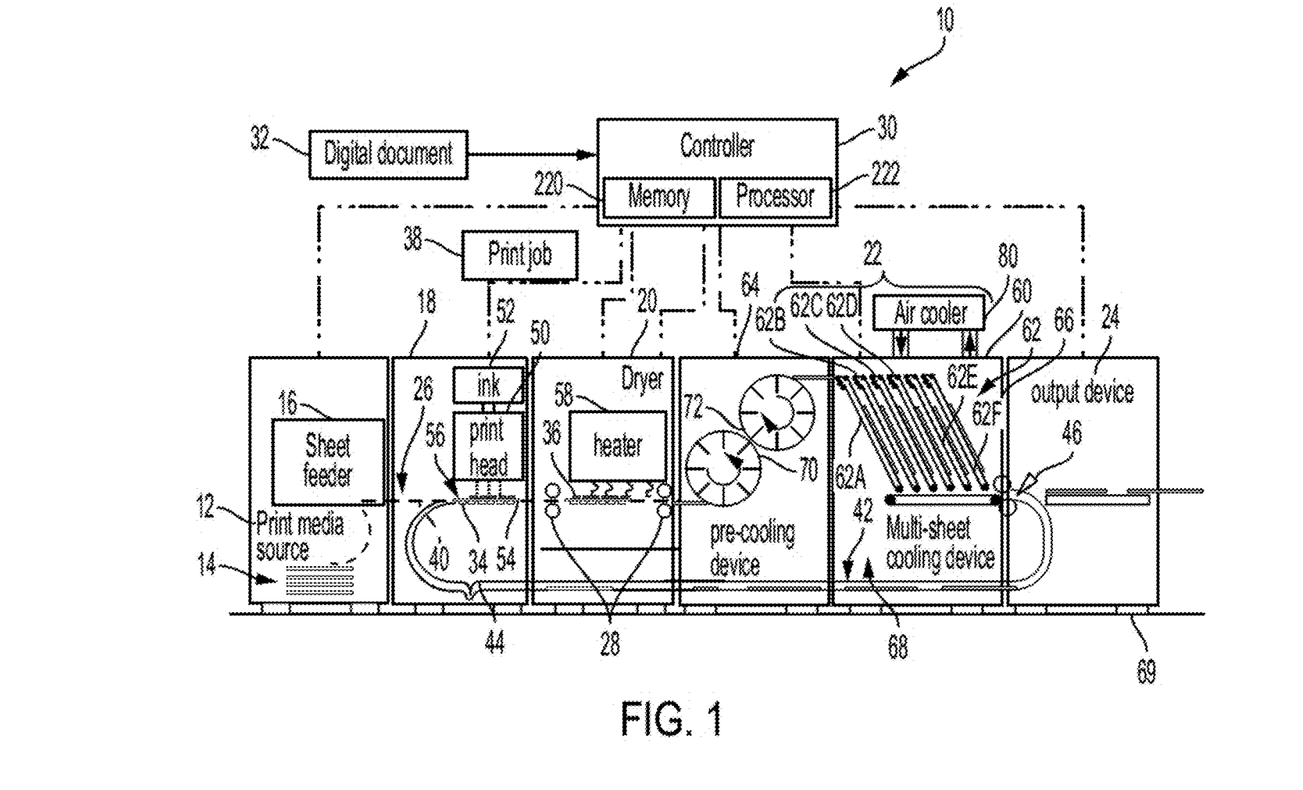
FIG. 1 is a functional block diagram of an inkjet printer incorporating a cooling system including a multi-sheet cooling buffer in accordance with one aspect of the exemplary embodiment.

With reference to FIG. 1, a printing device 10 includes a source 12 of print media sheets 14, a sheet feeder 16, at least one marking device 18, a dryer 20, a cooling system 22, and an output device 24, all connected by a print media path 26. A sheet transport system 28 conveys the print media sheets along the print media path, downstream from the sheet feeder 16 and ultimately to the output device 24. A controller 30 controls the operation of the components 16, 18, 20, 22, 24, and 28 of the printing device 10, and provides instructions for rendering a digital document 32 as printed images 34, 36 on opposite sides of the print media sheets 14. In particular, the controller sends pages of a print job 38 to one or more marking devices for printing.

In FIG. 1, the illustrated print media path 26 is configured for simplex or duplex printing. In particular, the print media path 26 includes a main path 40, which connects the sheet feeder 16 with the marking device 18, dryer 20, cooling system 22, and output device 24, and a return (or duplex) path 42, which connects the main path 40, downstream of the drier 20, with the main path, upstream of the marking device 18. The return path 42 directs already printed and dried sheets to the same marking device 20 for printing and may include an inverter 44 for inverting the sheets prior to returning to the marking device 18. A diverter 46 controls whether sheets are directed into the return path 42 or continue along the main path 40.

While the cooling system 22 is illustrated in FIG. 1 as being in the main path 40, between the dryer 20 and the diverter 46, in other embodiments, part or all of the cooling system 22 may be located in the main path 40, between the sheet feeder 16 and the marking device 18, or in the return path 42.

The illustrated marking device 18 includes one or more printheads 50, which eject droplets of ink 52, in liquid form, directly onto an image receiving surface 54 or 56 of one of the sheets 14 of print media to form the printed image 34, as illustrated. Alternatively, the printhead ejects ink onto an intermediate transfer member, such as a belt or drum (not shown) from which the formed image is transferred to the print media sheet.

The printheads 50 typically include an array of individual nozzles through which drops of ink are ejected by inkjets across an open gap to the image receiving surface to form an ink image during printing. In an inkjet printhead, individual piezoelectric, thermal, or acoustic actuators generate mechanical forces that expel the ink through the nozzle, in a faceplate of the printhead. The actuators expel an ink drop in response to an electrical signal. The magnitude, or voltage level, of the firing signals affects the amount of ink ejected in an ink drop. The firing signal is generated by a printhead controller with reference to image data. The marking device processes the image data to identify the inkjets in the printheads of the printer that are operated to eject a pattern of ink drops at particular locations on the image receiving surface to form an ink image corresponding to the image data. The locations where the ink drops landed are sometimes called "ink drop locations," "ink drop positions," or "pixels." Thus, a printing operation can be viewed as the placement of ink drops on an image receiving surface with reference to electronic image data.

The liquid ink 52 may be selected from aqueous inks, liquid ink emulsions, pigmented inks, phase change inks in a liquid phase, and gel or solid inks having been heated or otherwise treated to alter the viscosity of the ink for improved jetting. Ejecting ink with the printhead 50 may include ejecting ink with thermal ink ejectors or piezoelectric ink ejectors.

The dryer 20 applies heat to fixes the printed image(s) 36, 38 more permanently to the sheet 14. In particular, the ink ejected onto the print media dries, solidifies, gelatinizes, freezes, changes phase, increases in viscosity, and/or otherwise stabilizes before the ink penetrates the sheet sufficiently to produce show-through on a reverse side of the sheet.

In one embodiment, the dryer 20 circulates hot air, which heats the sheet 14 and the printed image 34, 36, causing water and/or non-aqueous solvent(s) to evaporate from the ink. In one embodiment, the drier includes a heater 58, such as a source of infrared energy, which heats the sheet from above the printed side. In other embodiments, the drier includes a heated platen (not shown), which supports the sheet and thus heats the sheet from the other side.

The illustrated in-line cooling system 22 is positioned intermediate the dryer 20 and the marking device 18 to reduce the temperature of the dried sheets prior to marking them (again) with the marking device 18 (duplex printing). The illustrated cooling system 22 includes a multi-sheet cooling buffer ("cooling buffer") 60, which is capable of cooling multiple sheets 14 contemporaneously in respective ones of an array 62 of two or more cooling stations 62A, 62B, 62C, 62D, 62E, 62F, etc. While six cooling stations are illustrated, fewer or more than six may be employed. Each of the cooling stations can accommodate a single sheet 14, although in some embodiments, the cooling stations can accommodate more than one sheet, e.g., two or more sheets, such that the sheets are spaced from each other. The number of sheets which can be accommodated in a single cooling station is dependent, in part, on the length of each sheet and the available length of the cooling station.

The cooling system 22 optionally further includes a pre-cooling device 64, positioned upstream of the cooling buffer 60 and/or a similarly-configured post-cooling device (not shown) downstream of the cooling buffer 60.

The output device 24 may include one or more trays, stackers, and the like. One or more finishing devices (not shown) may be positioned in the main path, either within or upstream of the output device 24.

The sheet transport system 28 includes components for transporting the sheets, such as rollers, conveyor belts, air jets, combinations thereof, and the like.

Some or all of the components 12, 18, 20, 64, 60, 24 of the printing device 10 may be separable modular units, each with a respective housing, e.g., as shown at 66 for the multi-sheet cooling buffer 60. In the case of the housing 66 for the multi-sheet cooling buffer 60, it may be insulated to define a temperature-controlled interior 68. Each housing 66 may be mounted on casters, wheels or other rotatable devices 69, which allow the housing 66 and its contents to be moved to a different location and/or replaced.

Figure 2:
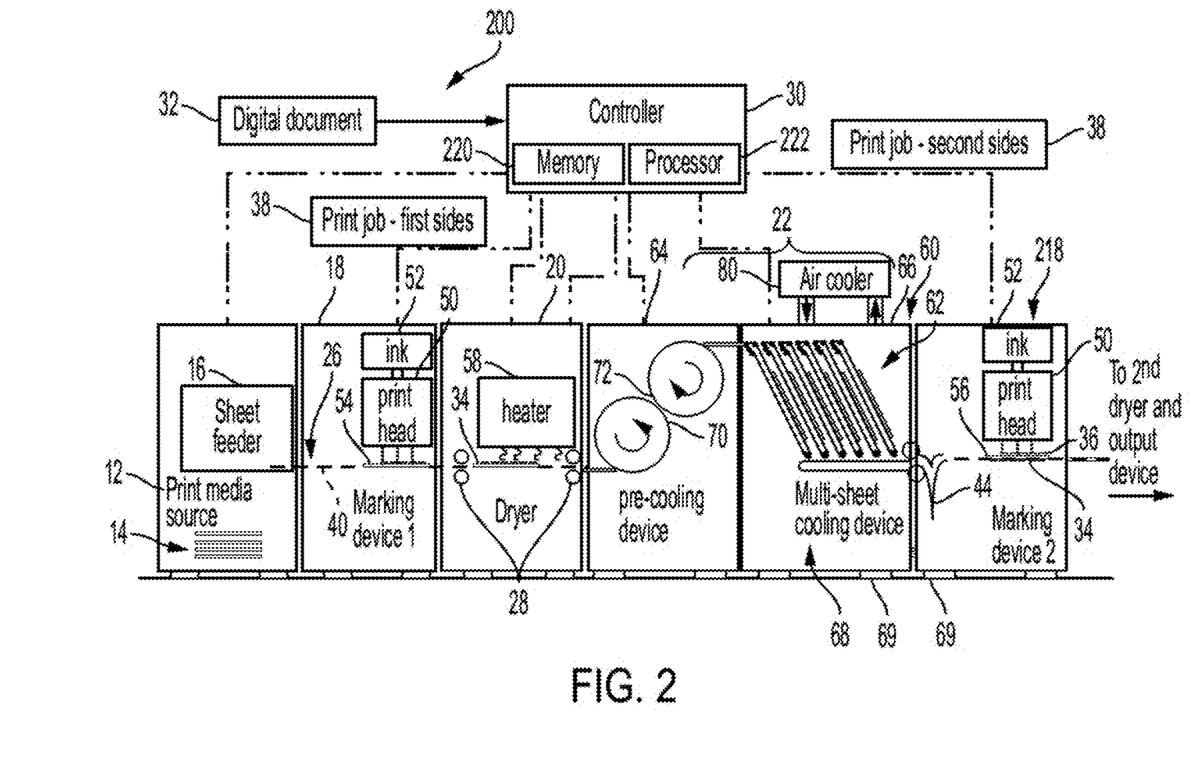
FIG. 2 is a functional block diagram of an inkjet printer incorporating a cooling system including a multi-sheet cooling buffer in accordance with another aspect of the exemplary embodiment.

FIG. 2 illustrates a similar printing device, which is described in further detail below.

Figure 3:
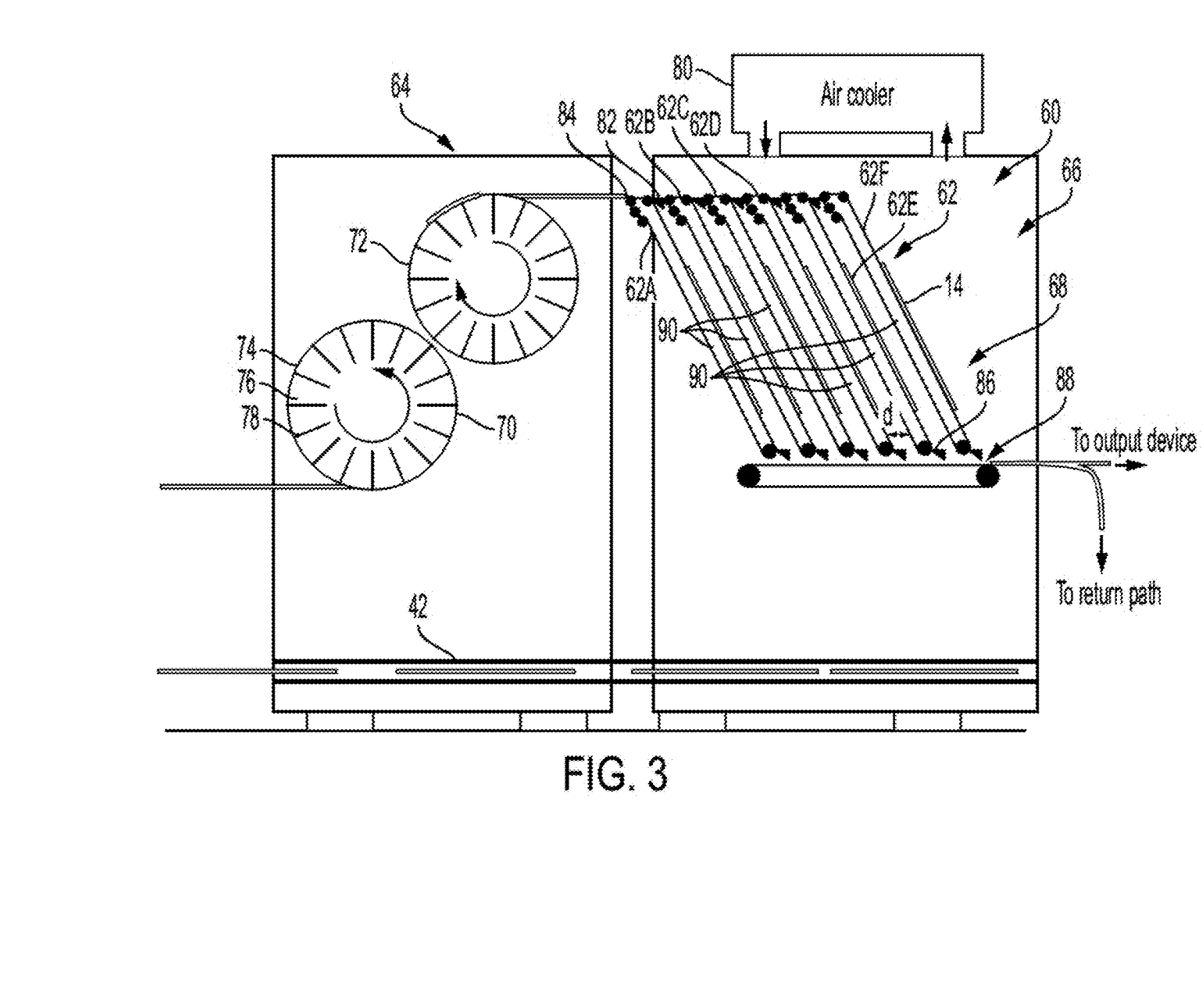
FIG. 3 is an enlarged view of the cooling system of FIGS. 1 and 2.

As illustrated in FIG. 3, the exemplary pre-cooling device 64 includes two (or more) cooled counter-rotating rollers 70, 72, around which each sheet passes, sequentially, before entering the multi-sheet cooling buffer 60. The rollers 70, 72 may each be in the form of a hollow drum 74 with an interior chamber 76, which is fed with a stream of cooled fluid, such as air or water. Cooling fins 78 may be positioned within the interior chambers 76, e.g., connected to an interior surface of the drum 74, to carry the heat away from the drum surface. The drum 74, and fins 78, where used, may be formed from a heat-conductive metal or alloy, such as aluminum.

The multi-sheet cooling buffer 60 receives partially-cooled sheets from the pre-cooling device 64, where used, or directly from the dryer 20. The cooling buffer 60 serves as a parking area for dried sheets 14, where the sheets can reach a desired temperature before (and/or after) printing. The interior 68 of the buffer housing 66 may be cooled by a cooling mechanism 80, such as an air cooler 80, such as an air conditioning unit. The air cooler circulates cooled air through the housing interior 68 and may recapture air leaving the interior. The air may be dehumidified as well as cooled, before (and/or after) entering the interior 68. Optionally, fans (not shown) within the interior aid in recirculating heated air to the air conditioner. Additionally, or alternatively, each of the array of cooling stations 62 may be individually cooled by a respective cooling mechanism, as described below.

In the exemplary embodiment, the set of cooling stations 62 includes six cooling stations 62A, 62B, 62C, 62D, 62E, 62F, which are used to move and park each sheet 14 temporarily in the cooled interior 68, within the housing 66. Sheets in the cooled area 68 are held at temperature so the surface and bulk temperature of the sheet is reduced to a desired temperature, before re-printing. While six cooling stations are illustrated, the number of cooling stations in the array 62 may be any suitable number, such as at least two, or at least three or at least four or at least five, or up to ten cooling stations, for example.

Upper open ends of the cooling stations 62A, 62B, 62C, 62D, 62E, 62F may all be horizontally aligned and lower open ends of the cooling stations 62A, 62B, 62C, 62D, 62E, 62F may be similarly horizontally aligned. Alternatively, the lower ends are aligned with each other at an angle which is the same as for the upper ends. In one embodiment, access to the upper ends of the cooling stations is controlled by entry diversion gates 82, which are operable to divert a sheet from an entry pathway 84 into the upper end of a respective one of the set 62 of cooling stations. Similar, exit diversion gates 86 may be positioned adjacent the lower end of each cooling station. These gates control the exit of the sheet into an exit pathway 88, provided, for example, by a conveyor belt.

While in the cooling station, the sheet may be restrained in a selected position by a restraining member 90. As will be appreciated other mechanisms may be used to direct the sheets into selected cooling stations, retain them for a predetermined time period, and eject/release them from the cooling stations when the predetermined time period has been met. The actuation of the mechanisms 82, 84, 90 may be under the control of the controller 30, such that the sheets obey a first in-first out principle, whereby each sheet can be held in the cooling buffer 60 for the same amount of time (retention time). To maintain the printing speed of the printer, the retention time is no more than the time between a first sheet entering the buffer 60 and an Nth sheet entering the buffer, where N is the number of cooling station. For example, if sheets are moving at 120 pages per minute, a sheet enters the buffer 60 every 0.5 seconds. For a six sheet buffer 60, this allows the first sheet to stay in the buffer for approximately 3 seconds before it is ejected or otherwise released. In this time, the temperature of the sheet can be reduced by at least 5° C. or at least 10° C., using one or more cooling mechanisms, such as cooled air, a cooling member, combinations thereof, and the like. In one embodiment, the cooled sheet exits the cooling buffer 60 and/or enters the marking device at a temperature of 40° C., or less, such as 37° C., or less, such as between ambient temperature (20° C.) and 35° C.

Figure 4:
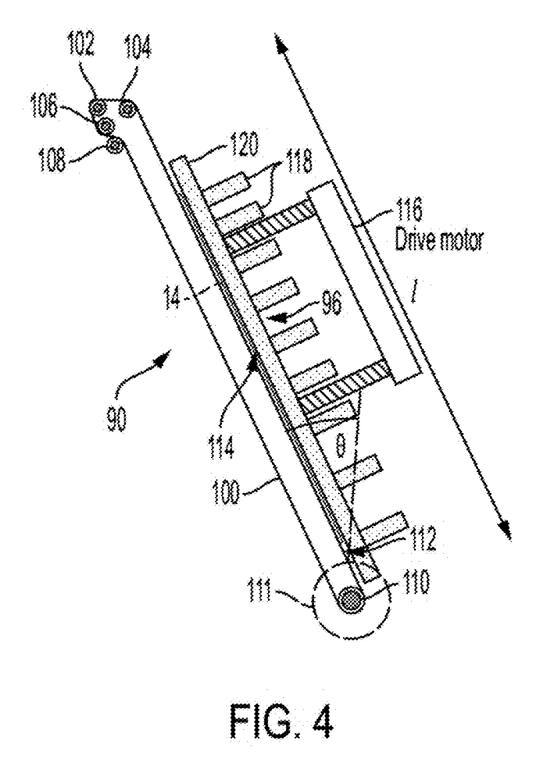
FIG. 4 is a cross sectional view of one embodiment of a sheet cooling station of the cooling system of FIG. 3, with a cooling plate in a first position.
Figure 5:
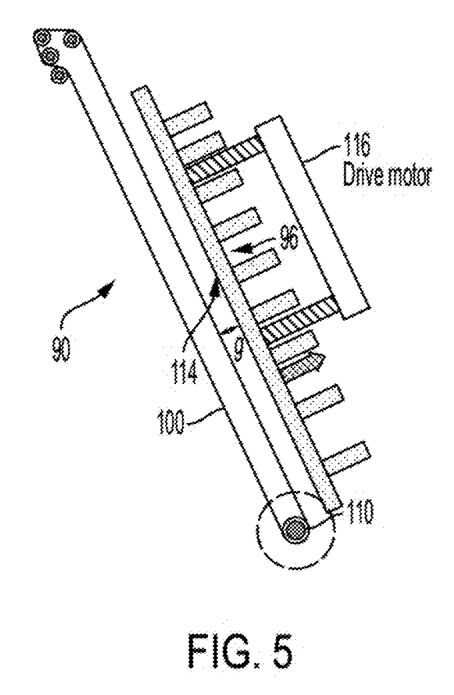
FIG. 5 is a cross sectional view of the sheet cooling station of FIG. 4 with the cooling plate in a second position.

As illustrated in FIGS. 4 and 5, in one exemplary embodiment, each cooling station 62A, etc., includes at least one sheet restraining member 90 for temporarily retaining the respective sheet 14 in a stationary position while it cools. The sheet restraining members 90 may each include one or more of a transport belt, releasable nip-defining rollers, a clamping plate, and the like. in an exemplary embodiment, the sheet restraining members 90 each include a belt transport 94, and a clamping plate 96, either or both of which may be cooled to serve as a cooling mechanism.

With reference to FIG. 4, the belt transport 94 includes a continuous belt 100, which is supported by a set of rollers 102, 104, 106, 108, 110 (five rollers in the illustrated embodiment). One or more of the rollers, e.g., roller 110, may be a drive roller, which causes the belt 100 to move when the roller rotates. The drive roller 110 is driven by a drive mechanism 111, such as a motor. The motor may be under the control of the controller 30, for intermittently turning the motor 111 on and off. For example, the controller actuates the motor, which causes the belt to move in a clockwise direction for drawing a sheet into the cooling station, stops the motor to pause the belt and allow the sheet to cool, then actuates the motor to move the belt 100 to direct the sheet from the cooling station (and draw the next sheet in).

A sheet receiving surface 112 of the belt 100 extends linearly between upper and lower rollers 104, 110 and is angled to the vertical. For example, an angle θ, between the sheet receiving surface 112 and vertical may be at least 10°, or up to 75°, or up to 45°, or up to 30°. The angle θ can be selected to allow the sheet to enter and leave the cooling station easily, while maintaining a compact footprint. Each belt 100 is at the same angle θ, with the belts arranged in parallel, at an interval d (FIG. 3). This spacing is sufficient to allow a sheet to move between two adjacent belt transports 94 (except for the last one in the sequence). The sheet receiving surface 112 has a length 1, which is at least as long as the sheet 14, in the process direction. The sheet is restrained, in a position intermediate the ends of the sheet receiving surface 112, for a period of time sufficient for the sheet to cool.

In the illustrated embodiment, the clamping plate 96 may help to restrain the sheet while it cools and may alternatively or additionally serve as a cooling plate. For example, when the belt 100 is an electrostatic hold-down belt, the plate may serve partly or solely for cooling the sheet. However, when the belt 100 does not electrostatically (or otherwise) serve to hold the sheet in position, the plate 96 may serve partly or solely for restraining the sheet between the plate and the belt 100.

The clamping plate 96 has a generally planar surface 114, which is brought into contact with (or at least in close proximity to) the sheet 14 while the sheet is positioned on the sheet receiving surface 112. The clamping plate 96 is moveable, relative to the sheet receiving surface 112, between a first position, illustrated in FIG. 4, in which the planar surface 114 of the clamping plate 96 contacts the sheet 14, and a second position, in which the plate 96 is spaced from the receiving surface 112 by a gap g, as illustrated in FIG. 5. The gap g is wider than a thickness of the sheet 14. In this position, the sheet exits the cooling station, e.g., under gravity and/or assisted by movement of the belt 100.

An actuator mechanism 116 (FIG. 4), such as a drive motor, moves the plate 96 between the first and second positions. There may be one mechanism 116 for each plate 96 or a single mechanism for moving all of the cooling/clamping plates. In the exemplary embodiment, the plates 96 move independently of each other, such that at any time during a print job, one or more of the plates 96 is in the first position and one or more of the plates 96 is in the second position. In other embodiments, other mechanisms, such as a spring biased actuators, or the like, may be used. The actuator mechanism 116 may be under the control of the controller 30.

The plate 96 may be formed of a heat-conductive material, e.g., a metal or alloy, such as iron, steel, brass, aluminum, and/or copper. The plate 96 may have a large surface area to increase heat dissipation. The plate 96 may be actively cooled, e.g., by the cooled air in the housing interior 68, and/or by a dedicated cooling system (not shown). In one embodiment, the dedicated cooling system passes a cooled fluid through an interior (not shown) of the cooling plate 96. In one embodiment, cooling fins 118 extend from an exterior surface 120 of the plate 96, remote from the sheet, to help draw the heat away from the sheet. The fins 118 may be spaced at intervals along the surface 120. While nine fins are illustrated, which may be cylindrical or rectangular in shape, any suitable number of fins of suitable size(s) and shape(s) may be employed to optimize the rate of cooling of the sheet. Other methods for actively cooling the plate 96 are also contemplated, such as via conduction through a water jacket or Peltier device. In another embodiment, the transport belt is actively cooled, e.g., from an interior of the belt, which can be achieved by any of the methods described above for cooling the sheet 14. In some embodiments, each cooling station may include a dedicated air-conditioning source.

Combinations of methods of cooling the sheet 14, plate 96 and/or belt 100 are also contemplated.

Figure 6:
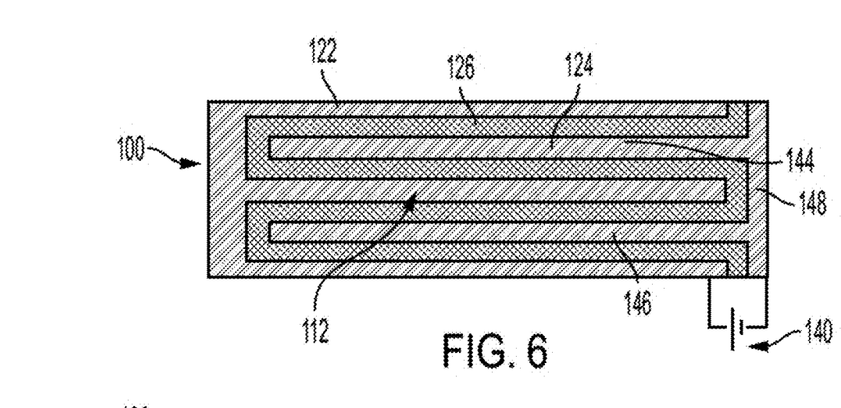
FIG. 6 is a top plan view of a sheet transport belt of the sheet cooling station of FIGS. 3-5.
Figure 7:
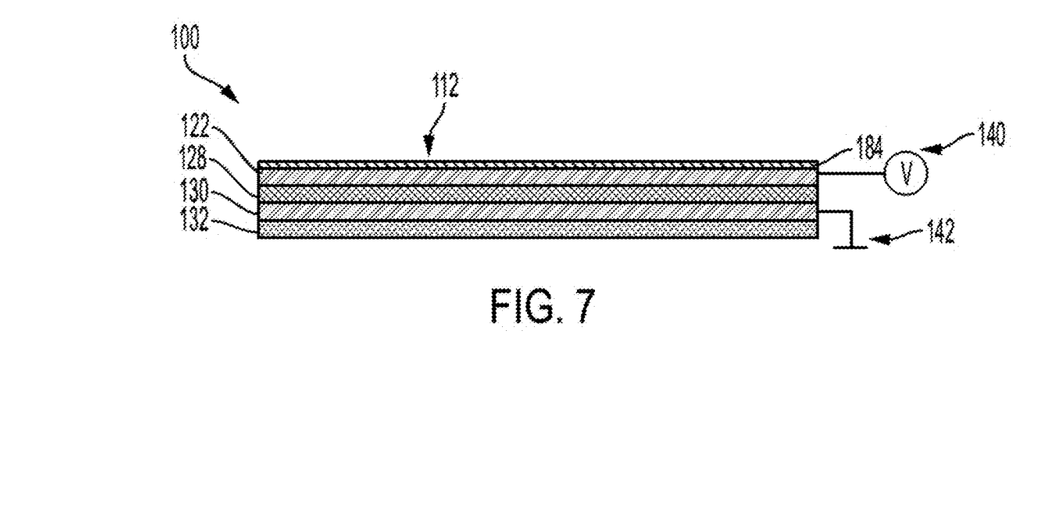
FIG. 7 is a side sectional view of the sheet transport belt of FIG. 6.

In one embodiment, the belt 100 is an electrostatic hold-down belt. An example portion of an electrostatic hold-down belt 100 is illustrated in FIGS. 6 and 7. As shown in top view in FIG. 6, planar interdigitated electrical conductors 122, 124 are electrically spaced from each other by a serpentine path 126 formed of an electrically-insulative material. As shown in side view in FIG. 7, the conductors are supported on a layer 128 of insulative material, which spaces the electrodes from a ground plane 130, formed from electrically-conductive material. An insulation layer 132 supports the other layers and may provide structural strength for the belt. The conductors and insulative material are sufficiently flexible to allow the belt 100 to bend around the rollers 102-110. The conductors 122, 124 and/or layer 130 can be formed of an electrically conductive material, such as copper, gold, aluminum, conductive alloy, metal-polymer nanocomposites, carbon powder, conductive rubbers, conductive paints, electrically-conductive polymers, combination thereof, or the like. In one embodiment, a stretchable electrode material may be used, e.g., an aluminized polyester film, such as a metalized Mylar™ film (or other electrically-conductive metalized polymer film). The electrically insulative material 126, 128, 132 may be a polyimide, silicone elastomer, acrylic elastomer, rubber, polyurethane (PU), polyvinylidene fluoride (PVDF), polyimide (PI), glass-reinforced epoxy laminate sheet, polyethylene terephthalate (PET) or combinations thereof. As an example, a polyimide, such as Kapton® from Dupont, may be used for material 126, 128 and a rubber material for the inner layer 132.

A voltage source 140 applies a voltage (such as a DC voltage) across the electrical conductors 122, 124, e.g., in the range of 500 to 1500 volts. The current ultimately flows to ground 142, via the layer 130. The voltage generates an electric field, which provides a hold down force which is sufficient to retain the sheet 14 on the belt 100 while it is being transported into the respective cooling station 62 and maintain the sheet in position while cooling. In particular, at the perimeter of each of the conductors, an electric field is generated that is proportional to the voltage applied. For example, DC power is applied across the two conductors which generates an electric field, which in turn generates the force needed to hold the sheet.

In the illustrated embodiment, the interdigitated conductors each include a series of electrically-conductive fingers 144, 146, etc., which extend in parallel from a common conductive strip 148 that connects the fingers 144, 146 with the voltage source 140 to provide a potential difference between them. The density of the conductive fingers and magnitude of the electrical voltage can be selected to provide a suitable electrical hold-down force, considering the size and weight of the sheets 14. As will be appreciated other arrangements of conductors for generating an electrical field are also contemplated.

In one embodiment, the conductors 122, 124 and insulative material 126 may define the outer surface 112 of the belt. In another embodiment, the conductors 122, 124 and insulative material 126 may be covered by a thin protective layer 150, or layer, e.g., 2 mm or less in thickness. In this case, the protective layer defines the outer surface of the belt. The protective layer 150 may reduce the risk of scratching of the conductors and/or provide a friction force between the belt 100 and the sheet that helps to reduce slippage between the sheet and the belt. The protective layer may be formed from a polymer, such as a polymer derived from one or more monomers, such as butyl acrylate, methyl acrylate, methyl methacrylate, cellulose acetate, and the like.

Figure 8:
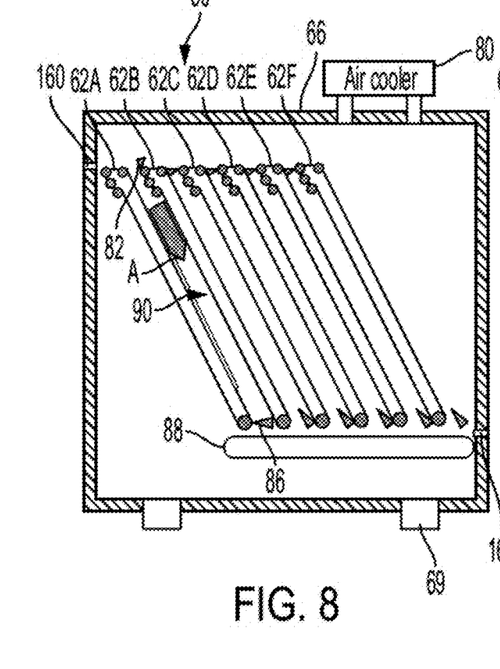
FIG. 8 illustrates a first sheet being fed into the multi-sheet cooling buffer of FIG. 3.
Figure 9:
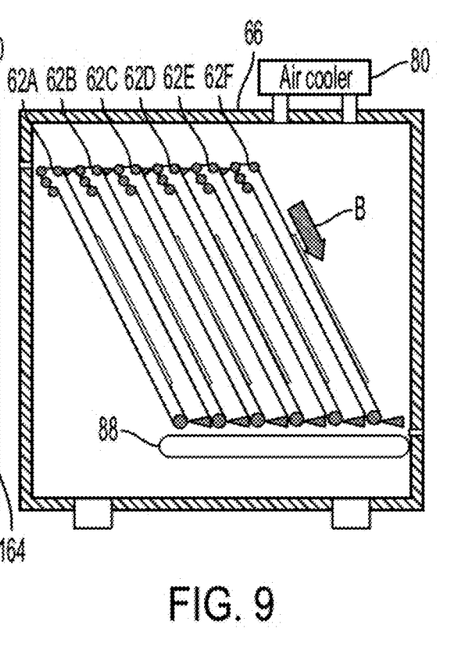
FIG. 9 illustrates a last sheet being fed into the multi-sheet cooling buffer of FIG. 3.
Figure 10:
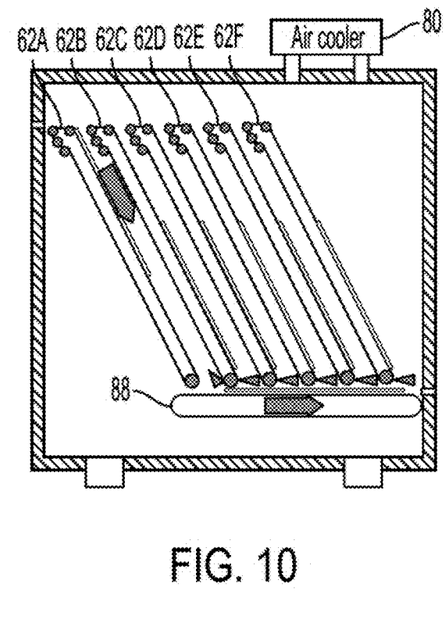
FIG. 10 illustrates the first sheet exiting from the multi-sheet cooling buffer.

As illustrated in FIGS. 8-10, the cooling stations 62A, 62B, 62C, 62D, 62E, 62F are arranged in a sequential order. The controller 30 controls delivery of the sheets to the cooling stations (and ejection/release therefrom) in a predetermined sequence. The incoming sheets may be fed into the cooling stations such that when the leading edge of a sheet reaches the bottom of a particular cooling station, the transport belt 100 ceases movement, and the sheet is parked in that position for a set amount of time. As illustrated in FIG. 8, for example, a first printed and dried sheet 14 enters the cooling buffer 60 through a common inlet, such as a slot 160, from which it can enter any one of the cooling stations. The controller 30 determines that the first available cooling station 62A is empty and instructs the cooling buffer to direct the sheet into that cooling station along a path indicated by arrow A. For example, the drive belt 100 of the cooling station 62A is actuated drawing the sheet into the cooling station. Alternatively, or additionally, the diversion gate 82 at the upper end of the cooling station 62A is opened and the sheet directed into the cooling station (only one diversion gate is illustrated for ease of illustration). Once the sheet has entered the cooling station 62A (unless the cooling station can accommodate more than one sheet in sequence), the upper diversion gate 82 is moved to a closed position, thereby preventing a next sheet from entering the same cooling station and allowing the next sheet to pass over the first cooling station 62A to the next cooling station 62B.

When one belt transport 100 is full, the lower diversion gate 86 is held in a closed position, as illustrated in FIG. 8. Additionally, or alternatively, the electrostatic belt 100 can be temporarily de-energized, until the sheet is released from the cooling station and acquired by the lower transport 88, downstream.

Once the first cooling station 62A is occupied, a similar procedure is followed to position the next arriving sheet in the second cooling station 62B. This process proceeds sequentially until all cooling stations 62A-62F are occupied (FIG. 9). For example, the last sheet enters the cooling station 62F along a path denoted by arrow B, which is parallel to the path denoted by arrow A. When all cooling stations are full, the first sheet to go into the array of cooling stations is driven out of the array (FIG. 10). The sheets leaving the angled cooling station array 62 are released in the same order that they went in (i.e., first-in-first out, last-in-last out). The lower transport 88 conveys the sheet out of the cooling buffer 60 via an exit slot 164. The lower transport 88 may be a horizontal transport, such as a conveyor belt, and may be an electrostatic transport. The cooled sheet exits the cooling buffer via the outlet, such as a slot 164, which is connected with the marking device (module). The releasing of a sheet from one of the cooling stations 62 is a signal that a subsequent sheet can be sent to the cooling station.

In this way all sheets in the multi-sheet cooler module experience equally the maximum amount of "dwell" time possible in the cooler "parking lot" module. The effective dwell time for a series of sheets stacked/parked horizontally can be many seconds. For example, if each transport belt 100 has a length of two feet (~61 cm) and there are 6 cooling stations in total, the belts can provide a total of 12 feet (~366 cm) of cooling length. If the sheets are conveyed on the belts 100 at an average speed of 85 cm/s, this corresponds to about 4 seconds of dwell time for each sheet. In another example, if each transport belt 100 has a length of three feet (~-91 cm) and there are 6 cooling stations in total, each cooling station could accommodate 3 sheets end to end, each sheet having a length of 11 inches (~28 cm), allowing the dwell time to be tripled to about 12 seconds, while maintaining the same throughput.

As will be appreciated, while FIGS. 8-10 illustrate the filling of the cooling stations in a left to right sequence, the cooling stations can be filed in any order. For example, the first sheet could be directed to cooling station 62F, the second sheet to cooling station 62E, and so forth. Additionally, if one of the cooling stations is out of order, e.g., blocked by a sheet or any of its components 82, 86, 96, 110, etc., become inoperative, the non-functional cooling station can be bypassed, without a significant reduction in sheet cooling time.

There may be an option for sheets to bypass the cooling stations. Thus, each sheet passes through no more than one of the cooling stations.

With reference once more to FIG. 2, another embodiment of a printing device 200 is shown which may be configured analogously to the printing device 10 of FIG. 1, except as noted. In this embodiment, a second marking device 218 is positioned downstream of the cooling system 22, and upstream of the output device (not shown for simplicity). The second marking device 218 may be similarly configured to the first marking device 18, except for the positioning of an inverter 44, upstream of the print head(s) 50. The second marking device 218 applies a printed image 36 to an opposite side 56 of the sheet to the first printed image 34. A second dryer (not shown), analogous to dryer 20, may be located in the main path 40, downstream of the second marking device 218. In this embodiment, the return path 42 can be omitted. Sheets heated by the dryer 20 are cooled by the cooling system 22, prior to being marked by the second marking device 218.

The controller 30 of the printing devices 10, 200 may include one or more computing devices, such as a PC, such as a desktop, a laptop, palmtop computer, portable digital assistant (PDA), server computer, cellular telephone, tablet computer, pager, combination thereof, or other computing device capable of executing instructions for performing the exemplary method. In some embodiments, the controller may include controller modules in one or more of the components 12, 18, 20, 64, 60, 24, 218 of the respective device 10, 200.

Figure 11:
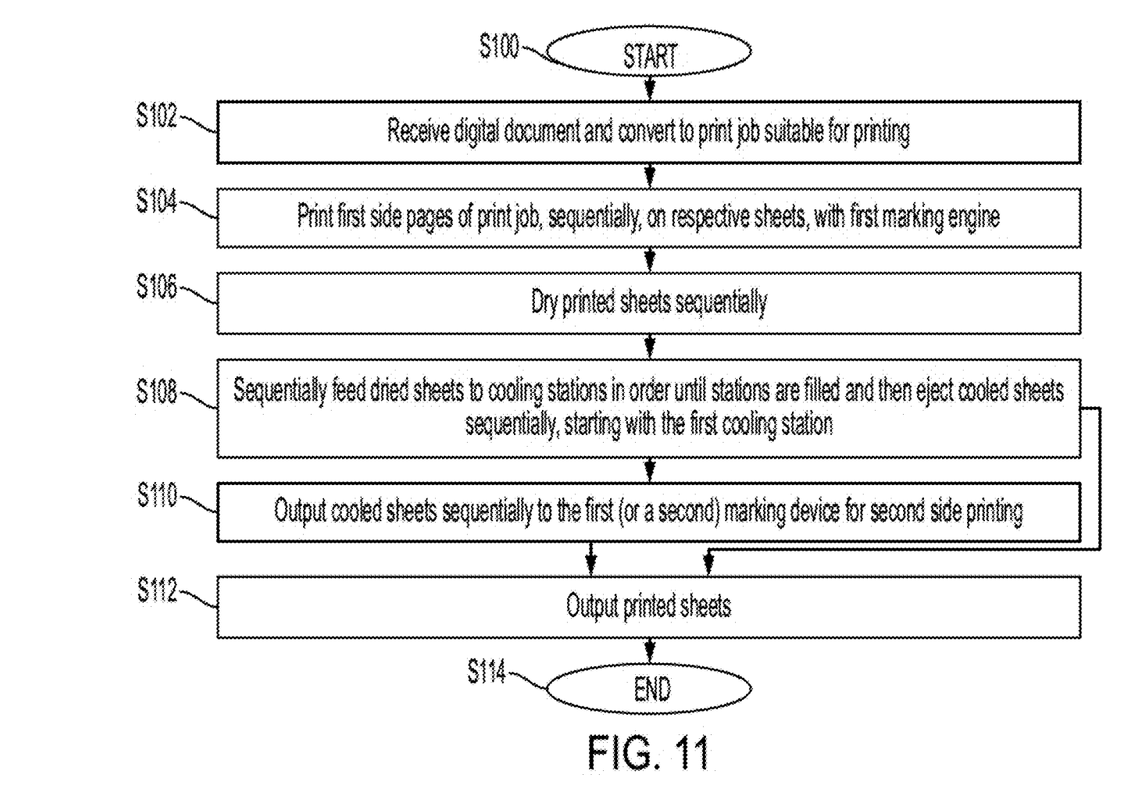
FIG. 11 illustrates a method of printing in accordance with another aspect of the exemplary embodiment.

The illustrated controller 30 includes memory 220 which stores software instructions for performing the method illustrated in FIG. 11 and a processor 222 in communication with the memory for executing the instructions. The controller 30 also includes one or more input/output (I/O) devices (not shown), such as an input interface for receiving documents and user instructions and an output interface for communicating with the printer components 12, 18, 20, 64, 60, 24, 218. The various hardware components of the controller 30, such as the memory, processor and interfaces, may all be connected by a data/control bus.

The memory 220 may represent any type of non-transitory computer readable medium such as random access memory (RAM), read only memory (ROM), magnetic disk or tape, optical disk, flash memory, or holographic memory. In one embodiment, the memory 220 comprises a combination of random access memory and read only memory. In some embodiments, the processor 222 and memory 220 may be combined in a single chip.

The network interface(s) allow the controller to communicate with other devices via a computer network, such as a local area network (LAN) or wide area network (WAN), or the internet, and may comprise a modulator/demodulator (MODEM) a router, a cable, and/or Ethernet port.

The digital processor device 222 can be variously embodied, such as by a single-core processor, a dual-core processor (or more generally by a multiple-core processor), a digital processor and cooperating math coprocessor, a digital controller, or the like. The digital processor 222, in addition to executing instructions stored in memory may also control the operation of the controller 30.

The term "software," or "instructions," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions. The exemplary printing device 10, 200 is suited to printing heavy-weight and glossy papers which tend to retain a significant amount of heat after printing. For example, sheets of plain and gloss stocks, of up to 300 gsm or higher, can be printed at the full rated speed of the printing device, e.g., 200 prints per minute (ppm) or above.

The inline multi-sheet buffering system 60 described herein provides several benefits. In particular, it provides additional dwell time for sheet cooling without any significant impact on productivity. The multiple parallel cooling stations 62A-F independently accept sheets (i.e., without the sheet passing through another of the cooling stations), allowing multiple sheets to be cooled contemporaneously and independently released for further processing after a delay. While in the cooling stations each sheet 14 (except for the last) is spaced from the next sheet, e.g., by an actuated cooling plate and the electrostatic conveyor belt of the next cooling station in the array. The multi-sheet buffering system 60 enables a large effective cooling length for sheets with a minimal footprint increase, without expected image quality degradation, and without reducing productivity. Printheads can be run for longer time periods due to improved run jetting stability. Cooling of the sheets can be achieved by one or more methods, such as cooled air, a cooled transport belt 100, a cooling plate 96, and combinations thereof. The nipless hold-down belt transport 100 provides a continuous surface which is conducive to promoting heat transfer to the belt itself. The system 60 also reduces sheet temperature in simplex printing output so that the stack temperature of the finished output does not exceed safety thresholds.

FIG. 11 illustrates an example printing method which can be performed with the apparatus of FIG. 1 or FIG. 2. The method starts at S100.

At S102, a digital document is received by the controller and converted into a print job including digital pages to be printed as one or more copies. For example, the print job includes printing of seven duplex sheets (14 pages).

At S104, the marking engine sequentially prints the first sides of seven sheets of paper with a respective image, e.g., by inkjet printing.

At S106, the printed sheets are sequentially sent to the dryer for drying, which raises the temperature of each sheet.

At S108, the dried sheets arrive sequentially in the cooling module 60. As discussed above, and assuming the cooling module is empty of sheets at the start of printing the print job, the first sheet is cooled in the first cooling station, and so forth up to the sixth sheet in the sixth cooling station. Since in the illustrated embodiment, there are only six cooling stations, the first sheet exits the first cooling station shortly before (or during) the introduction of the seventh sheet to the first cooling station.

At S110, optionally, the cooled sheets are sequentially delivered to the marking device 18 (or 218), in the same order, starting with the first cooled sheet, where they are printed on the opposite side of the sheet (or on the same side of the sheet, for example if an overlay coating is used).

At S112, the printed sheets are then output to the output device 24.

The method ends at S114.

EXAMPLES

A prototype belt 100 is constructed using aluminized Mylar™ as the conductive material (both the solid ground plane 130 and the thin conductors 122, 124). Kapton® tape is used to insulate these two conductive elements, and a thin covering 150 of adhesive tape (Scotch tape, by 3M) is placed over top of the entire array of conductors/insulators. The thin conductors in this demonstration are 5 mm wide, with a gap of 5 mm between adjacent fingers, The length of the belt prototype is about 22.5 cm. As will be appreciated, the dimensions are not limited. Several paper types are evaluated, from 20 gsm to 100 gsm, some being glossy and some being matte. It is demonstrated that a sheet of paper (Vitality 20# paper (8.5"×11")), positioned on the prototype belt, with a free-hanging weight of 280 g attached to one end by a clip, is able to be supported on the prototype belt, without slippage, when the belt is energized at 1300V. In this example arrangement the electrostatic hold-down is applied on only about one third of the sheet, whereas in practice, the entire sheet would be held by the belt hold-down device. Lower voltages (about 200V) are also found to provide noticeable hold-down forces which may be sufficient, depending on the angle of the belt.

Another evaluation is performed using added cooling in a conventional duplex inkjet printing device. It is found that reducing the temperature of sheets before entering the inkjet marking device can noticeably improve image quality. There is less tendency for the printheads to overheat, particularly in long print jobs using heavy weight and coated paper. Depending on the type of ink used, when the printhead temperature is reduced by about 5° C., by cooling the incoming sheets, improved graininess performance is observed, particularly in the smoothness of skin tones in a printed image. An improvement in jetting stability is also observed when the printhead, as determined by the missing jet accumulation rate. For example, for a cyan ink, the missing jets/1000 pixels for a printhead is observed to drop from 9 to 5 and for a black ink from 3 to 2, when the printhead temperature is reduced by 5° C.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A multi-sheet cooling buffer comprising:
   an inlet and an outlet;
   a sheet cooling mechanism; and
   an array of cooling stations, intermediate the inlet and the outlet, which are configured to receive print media sheets independently from the inlet and direct cooled sheets towards the outlet, whereby multiple print media sheets are cooled contemporaneously in the multi-sheet cooling buffer.

2. The multi-sheet cooling buffer of claim 1, wherein each of the cooling stations includes a belt transport.

3. The multi-sheet cooling buffer of claim 2, wherein each of the belt transports includes a continuous belt.

4. The multi-sheet cooling buffer of claim 3, wherein the continuous belt includes a sheet-receiving surface which is angled to vertical at greater than 10°.

5. The multi-sheet cooling buffer of claim 3, further comprising a voltage source which generates an electrostatic force in the belt.

6. The multi-sheet cooling buffer of claim 1, wherein the multi-sheet cooling buffer comprises a housing which houses the cooling stations, and wherein the cooling mechanism comprises an air cooler which cools air within the housing.

7. The multi-sheet cooling buffer of claim 1, wherein the cooling mechanism comprises a cooling plate for each cooling station.

8. The multi-sheet cooling buffer of claim 7, wherein the cooling mechanism further comprises an actuation mechanism which moves the cooling plate between a first position, adjacent a respective sheet while it is in the cooling station, and a second position, removed from the sheet.

9. The multi-sheet cooling buffer of claim 1, wherein at least one of the cooling stations further includes a gate, which is moveable between an open position, in which a respective sheet is able to enter the cooling station, and a second position, in which the sheet is directed to a subsequent one of the cooling stations.

10. The multi-sheet cooling buffer of claim 1, wherein each of the cooling stations cools a maximum of one sheet at a time.

11. The multi-sheet cooling buffer of claim 1, further comprising a controller which controls delivery of the sheets to the cooling stations in a predetermined sequence.

12. The multi-sheet cooling buffer of claim 1, further comprising a horizontal transport which conveys cooled sheets from the cooling station to the outlet.

13. The multi-sheet cooling buffer of claim 1, wherein the array of cooling stations comprises at least four cooling stations.

14. A printing device comprising the multi-sheet cooling buffer of claim 1 and at least one marking device positioned in a print media path upstream and/or downstream of the multi-sheet cooling buffer.

15. The printing device of claim 14, further comprising a dryer for drying printed sheets, the dryer being in the print media pathway, upstream of the multi-sheet cooling buffer.

16. A sheet processing method comprising:
   receiving a sequence of print media sheets through a common inlet;
   directing the sheets in a sequence to respective ones of an array of cooling stations until each of the cooling stations holds a respective one of the sheets;
   cooling the sheets in the cooling stations; and
   releasing the sheets from the cooling stations in the same sequence to a common outlet.

17. The method of claim 16, further comprising restraining the sheets in the respective cooling stations for a predetermined period of time.

18. The method of claim 17, wherein the retraining is performed with at least one of an electrostatic belt transport and a clamping plate.

19. The method of claim 16, further comprising printing images on the cooled sheets with a marking material.

20. A printing device comprising:
   a print media source;
   an output device;
   a print media pathway connecting the print media source and the output device;
   a marking device in the print media pathway, intermediate the print media source and the output device, which forms images on the print media with a marking material;
   a dryer in the print media pathway, downstream of the marking device, which dries the images and increases a temperature of the sheets; and
   a multi-sheet cooling buffer, downstream of the dryer, which cools the heated sheets, the multi-sheet cooling buffer comprising:
      an array of cooling stations which are each configured to receive heated print media sheets, each of the cooling stations including a continuous belt, a sheet receiving surface of each of the belts being arranged in parallel, whereby multiple print media sheets are cooled contemporaneously in the multi-sheet cooling buffer.

* * * * *